D. H. REEVES

July 5, 1932. LIQUID LEVEL GAUGE Re. 18,514

Original Filed Dec. 3, 1920

Inventor

Donald H. Reeves

By Robert H. Young

Attorney

Reissued July 5, 1932 Re. 18,514

UNITED STATES PATENT OFFICE

DONALD H. REEVES, OF DAYTON, OHIO, ASSIGNOR, BY MESNE ASSIGNMENTS, TO THE LIQUIDOMETER CORPORATION, OF LONG ISLAND CITY, NEW YORK, A CORPORATION OF DELAWARE

LIQUID LEVEL GAUGE

Original No. 1,758,975, dated May 20, 1930, Serial No. 423,096, filed December 3, 1920. Application for reissue filed February 18, 1932. Serial No. 595,192.

My invention relates to hydraulically operated gauges for visually indicating the level or quantity of liquid in a tank or reservoir. The invention primarily is designed for use on aircraft of all kinds and especially airplanes to indicate at the instrument board the quantity of gasoline or other liquid fuel in the main reservoir.

It is desirable, especially in airplanes, to have a liquid fuel level gauge operated otherwise than mechanically in order that the indicating dial or indicator may be located at a point remote from the reservoir both as regards distance and intervening objects.

A further object of my invention is to provide a liquid level gauge which entirely eliminates the use of a gland between the reservoir and the indicator. Another object in view is to provide a hydraulically operated liquid level gauge which will correctly indicate the level or quantity of liquid fuel in the reservoir regardless of changes in the temperature.

Other objects and advantages of the invention will appear as the description proceeds.

Figure 1:
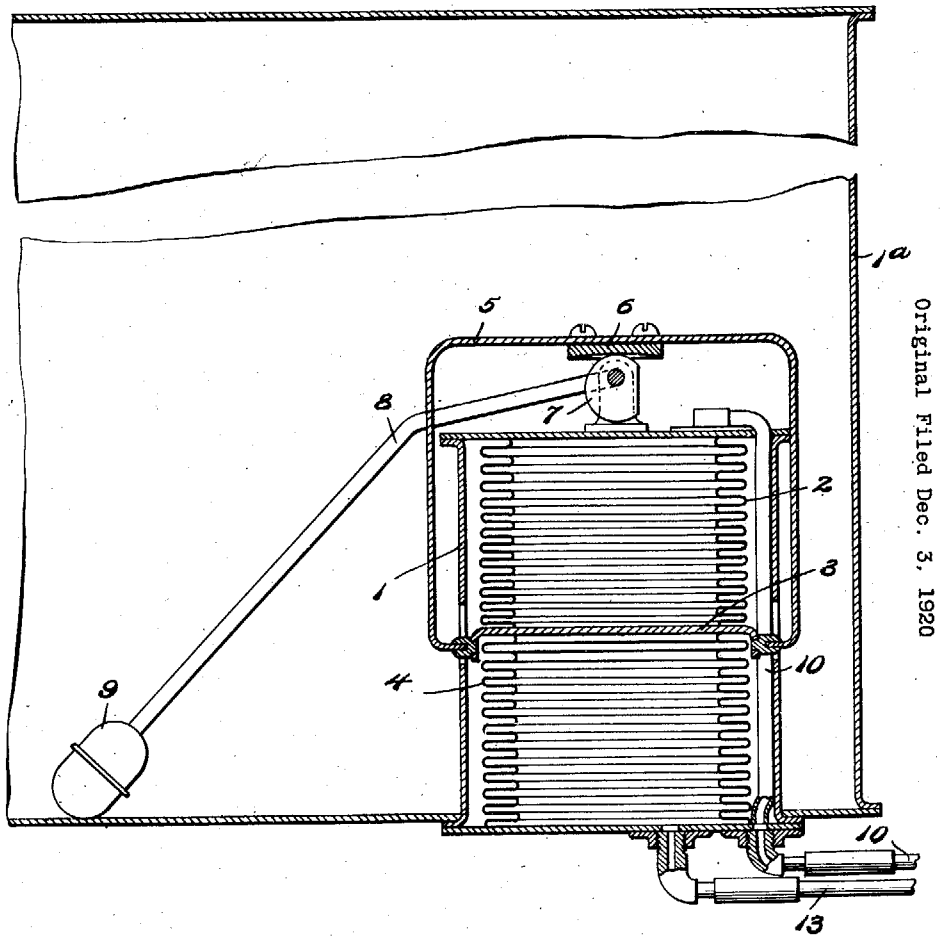
Figure 1 is a view partly in vertical section and partly in elevation showing the mechanism of the gauge.
Figure 2:
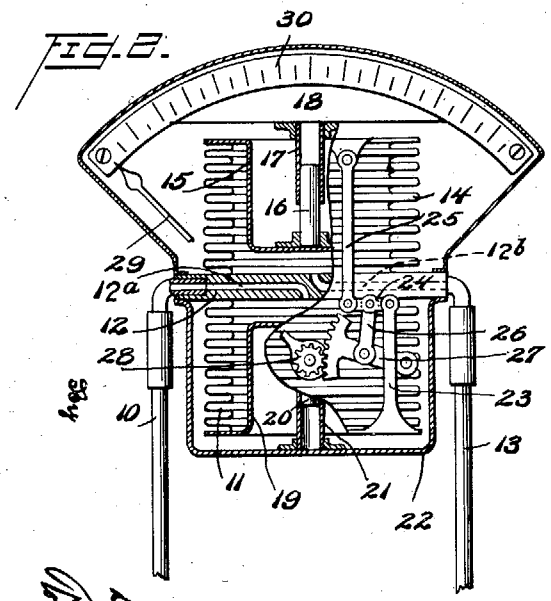
Figure 2 is a vertical sectional view of the indicator.

Referring primarily to Figure 1 of the drawing, 1 designates a casing of any suitable material such as sheet metal the same being securely fastened in a fixed position to the bottom of a tank or reservoir $1^a$. Attached to the top of the casing 1 is a bellows 2, the lower end of which is fastened to a vertically movable diaphragm 3. To the under side of the diaphragm 3 there is attached the upper end of another bellows 4 and the botom of the bellows 4 is fixedly attached to the bottom of the casing 1. The bellows 2 and 4 have the same capacity and each of said bellows is in the form of a cylinder having a deeply corrugated side wall as shown which provides for vertical contraction and expansion thereof when subjected to pressure as hereinafter described.

Attached to the diaphragm 3 is a bail shaped yoke 5 having fastened to the top thereof a block or bearing member 6 which rests against a cam 7. Fastened to the cam 7 and extending therefrom is a rod or stem 8, and at the free end of said rod is a float 9. All the mechanism here described is contained within the tank or reservoir $1^a$, the float 9 being adapted to rise and fall with the level of liquid in said reservoir.

Communicating with the top of the bellows 2 is one end of a tube 10 which at its other end communicates with a bellows 11 through a block or head 12 as shown, said block having a passage $12^a$ extending therethrough and opening into the bellows 11. Communicating with the bellows 4 is another tube 13 which at its other end communicates with still another bellows 14 by means of a passage $12^b$ extending through the block or head 12 and communicating with said bellows 14. The bellows 14 has its lower end attached to the block or head 12 and has attached to its upper end a cup 15 which carries a centrally arranged guide rod 16 movable in a tubular guide 17 attached to the upper gauge housing 18, the bottom of which is fastened to the block or head 12. To the bottom of the head 12 there is attached the upper end of the bellows 11 and the latter has attached to its lower end a cup 19 carrying a guide rod 20 working in a tubular guide 21 attached to the bottom of the lower gauge housing 22, the top of which is fastened to the head 12. Bellows 11 and 14 have the same capacity. The bellows 2, tube 10 and bellows 11 contain a liquid having a low coefficient of expansion and having the same volume as the same kind of liquid contained in the bellows 4, tube 13 and bellows 14.

Attached to the cup 19 is an arm 23 and to the top of said arm is pivoted a link 24. At the inner end of the link 24 there is another link 25 which is pivotally attached at its upper end to the cup 15. Pivotally attached to the link 24 between the members 23 and 25 is another link 26 extending downwardly and having its lower extremity pivotally connected to a sector gear 27 which meshes with a pinion or gear 28 having attached thereto a pointer 29 movable over a graduated scale 30.

The operation of the mechanism above described is as follows:

As gasoline or other liquid fuel rises in the tank 1[a], the float 9 is raised, operating the cam 7 and lifting the diaphragm 3 by means of yoke 5 and block or bearing member 6. This forces the liquid contained in the bellows 2 through the tube 10 into the bellows 11, the expansion of which forces down the cup 19. At the same time the diaphragm 3 in raising, expands the bellows 4 which draws liquid from the bellows 14. This forces cup 15 downwardly. Since the bellows 2 and 4 are identical and the bellows 11 and 14 are identical the motions of the cups 19 and 15 will be the same. Thus arm 23 and link 25, and therefore links 24 and 26, will move simultaneously, forcing downwardly the sector gear 27 which by turning gear 28 moves the pointer 29 over the graduated scale, indicating the quantity or level of liquid in the reservoir on the scale 30, the latter being calibrated for the particular reservoir.

Now assume an increase in temperature. The liquid at each side the diaphragm 3 will expand and through tubes 10 and 13 will expand the liquid in the bellows 11 and 14. In such case the arm 23 and link 25 will move the same amount but in opposite directions and thus the link 24 will simply turn about its central pivot and will not move the link 26. The pointer 29 will therefore remain motionless.

While I have herein shown and described one embodiment of the present invention it is to be understood that the same principles may be carried out in other ways as defined within the scope of the appended claims.

What I claim is:

1. In a liquid level gauge, the combination of a liquid reservoir having opposed bellows positioned therein, a plate between said bellows and connected to each of the same, a float in said reservoir, means for imparting movement to said plate and said bellows upon movement of said float, an indicator actuator including opposed bellows, fluid conducting conduits connecting said first named bellows respectively with said second named bellows and visual indicating means connected to and actuated by the movement of said second named bellows.

2. In a liquid level gauge, the combination of a liquid reservoir, opposed bellows in said reservoir, a plate, said bellows having their opposed ends secured to said plate, a float in said reservoir, means for imparting move ment to said plate upon movement of said float to expand one bellows and contract the other upon the rise and fall of the liquid in said reservoir, indicating means without said reservoir and indicator operating means in communication with and actuated by said bellows.

3. In a liquid level gauge, the combination of a liquid reservoir, opposed bellows in said reservoir, a plate, said bellows having their opposed ends secured to said plate, a float in said reservoir, means including a cam for imparting movement to said plate upon movement of said float to expand one bellows and contact the other upon the rise and fall of the liquid in said reservoir, indicating means without said reservoir and indicator operating means in communication with and actuated by said bellows.

4. In a liquid level gauge, the combination of a liquid reservoir, opposed bellows in said reservoir, a plate, said bellows having their opposed ends secured to said plate, a yoke connected to said plate, a cam in engagement with said yoke, a float in said reservoir in connection with said cam whereby said yoke is moved by the movement of said float in said reservoir, and by the connection of said yoke with said plate to expand one bellows and contract the other upon the rise and fall of the liquid in said reservoir, indicating means without said reservoir and indicator operating means in communication with and actuated by said bellows.

5. In combination, a float, an indicator, and means controlled by said flat for actuating said indicator, said means comprising a pair of liquid containing chambers and connections for causing one of said chambers to be expanded and the other to be contracted by movement of said float, and including a link connected to said chambers to be idly oscillated thereby upon expansion of both of said chambers or contraction of both of said chambers and to be operatively bodily shifted upon expansion of one of said chambers and contraction of the other.

6. In combination, a pair of liquid containing chambers, a float, an indicator, float-controlled means for causing one of said chambers to expand (or contract) and the other of said chambers to contract (or expand) to actuate said indicator, and means including devices for preventing thermal expansion or contraction of the liquid in said chambers from actuating the indicator, said devices including a floating link connected to each of said chambers to be actuated by each of said chambers in opposite directions.

In testimony whereof I hereto affix my signature.

DONALD H. REEVES.